United States Patent
Borg

(10) Patent No.: US 6,427,818 B1
(45) Date of Patent: Aug. 6, 2002

(54) SYNCHRONIZING DEVICE IN A VEHICLE GEARBOX

(75) Inventor: Anders Borg, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/581,633

(22) PCT Filed: Dec. 15, 1998

(86) PCT No.: PCT/SE98/02309

§ 371 (c)(1),
(2), (4) Date: Sep. 11, 2000

(87) PCT Pub. No.: WO99/34127

PCT Pub. Date: Jul. 8, 1999

(30) Foreign Application Priority Data

Dec. 15, 1997 (SE) ................................................ 9704669

(51) Int. Cl.⁷ ............................................... F16D 23/06
(52) U.S. Cl. .................. 192/53.32; 192/53.34
(58) Field of Search ........................... 192/53.32, 53.34, 192/48.91; 74/339

(56) References Cited

U.S. PATENT DOCUMENTS

| | | |
|---|---|---|
| 4,807,733 A | 2/1989 | Adler |
| 4,811,825 A | 3/1989 | Christian et al. |
| 5,560,461 A | 10/1996 | Loeffler |
| 5,657,844 A | 8/1997 | Wagner |
| 5,678,670 A * | 10/1997 | Olsson .................... 192/53.32 |
| 5,758,753 A * | 6/1998 | Sypula et al. ............ 192/53.32 |

FOREIGN PATENT DOCUMENTS

| | | |
|---|---|---|
| DE | 1 906 863 | 8/1970 |
| DE | 37 37 578 | 5/1988 |
| DE | 195 47 492 | 5/1997 |
| EP | 0 819 864 | 1/1998 |
| FR | 2 556 437 | 6/1985 |
| JP | 6-81856 | * 3/1994 |
| JP | 7-301255 | * 11/1995 |

OTHER PUBLICATIONS

Abstract of JP 6–81856 Mar. 1994.
Abstract of JP 7–301255 Nov. 1995.

* cited by examiner

Primary Examiner—Rodney H. Bonck
(74) Attorney, Agent, or Firm—Young & Thompson

(57) ABSTRACT

Synchronizing device in a gearbox with double synchronization. The torque is transmitted between the inner and the outer synchronizing ring (11 and 12, respectively) by means of a driver disc (20), which is made with radial driver fingers (22, 23), which engage in notches in the respective synchronizing ring. The driver fingers (22) for the outer synchronizing ring (12) are axially bent out and are received in notches (26) in a guide sleeve in order to save axial space.

6 Claims, 3 Drawing Sheets

Figure 1:
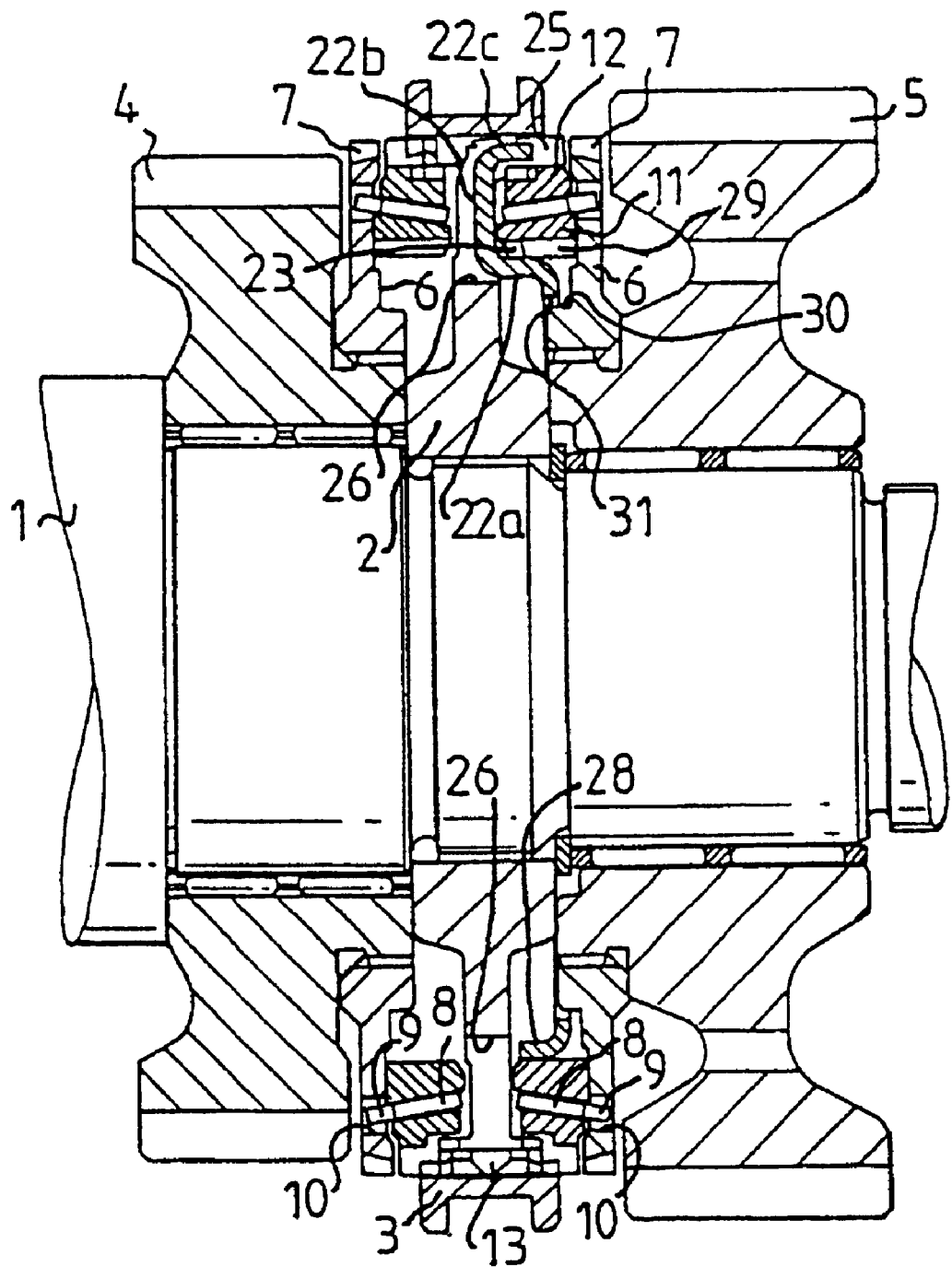

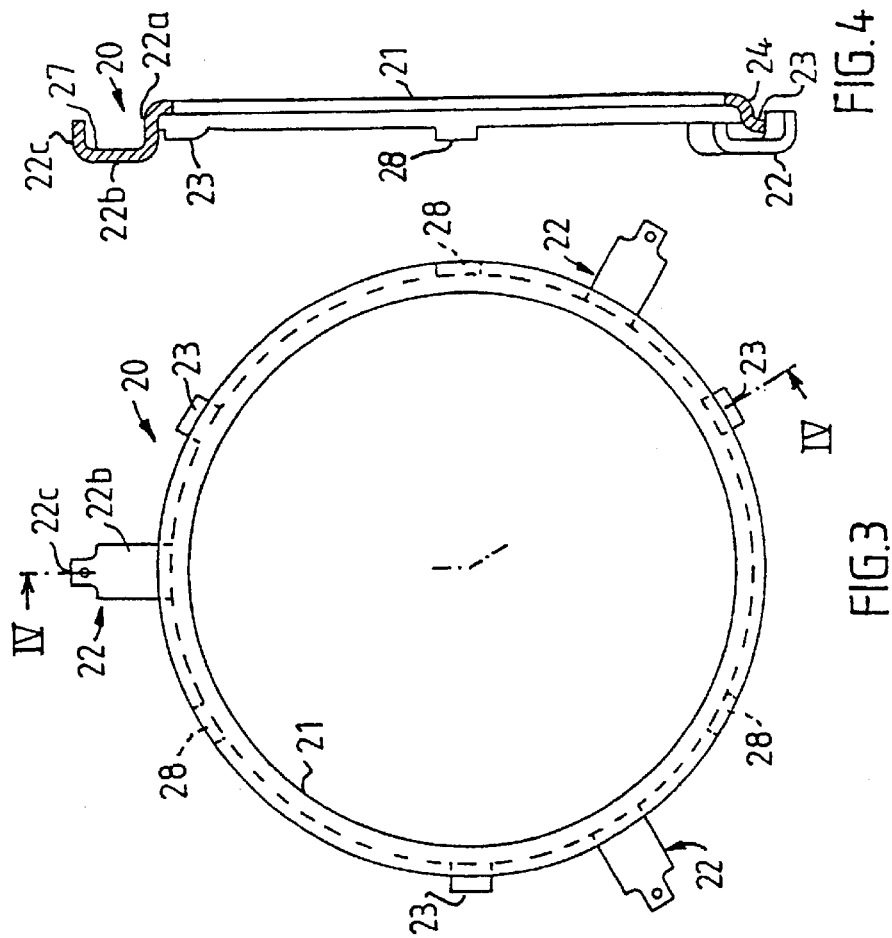
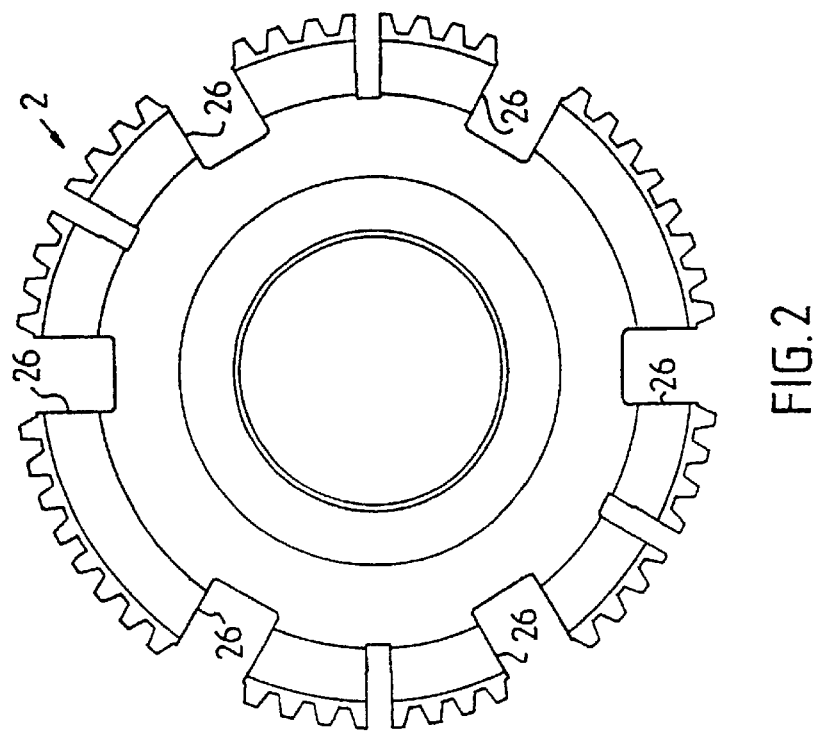

SYNCHRONIZING DEVICE IN A VEHICLE GEARBOX

The present invention relates to a synchronizing device in a vehicle gearbox, comprising a guide sleeve, intended to be non-rotatably joined to a shaft in the gearbox, an engaging sleeve, which is non-rotatably but axially displaceably mounted on the guide sleeve, an engaging ring provided with external engaging teeth, said ring being intended to be solidly joined to a gear rotatably mounted on the shaft and be lockable relative to the guide sleeve by axial displacement of the engaging sleeve from a neutral position to an engagement position, in which internal engaging teeth on the engaging sleeve engage the external teeth on the engaging ring, and synchronizing means cooperating with the engaging sleeve and the engaging ring in the form of at least two concentric synchronizing rings each having a conical frictional surface, said rings being movable into engagement with opposing conical frictional surfaces on a synchronizing cone lying between the synchronizing rings and being fixed rotationally relative to the engaging ring, the one synchronizing ring being fixed rotationally relative to the other synchronizing ring by means of an annular torque-transmitting element.

Synchronizing devices of the above mentioned type, so-called double synchronizers, are used i.a. in gearboxes for trucks in order to increase the synchronizing torque and thus reduce the work of shifting and make possible short movement of the shift lever when shifting. A double synchronization provides approximately 30% reduction in the shifting force on the shift lever, compared with a corresponding single synchronization, and also permits steeper locking angles, which facilitates release after completed synchronization.

In a synchronizing device of the type described by way of introduction, which is known, for example, by Swedish Lay-Open Print 448 182, the torque-transmitting element is an annular sheet metal disc, which is provided with radial projections which engage in notches in the respective synchronizing ring. The metal disc lies completely to one side of the guide sleeve in a gap between it and the synchronizing rings, which means that each metal disc in the gearbox increases the axial length of the gearbox with its thickness plus the required play between the disc and the adjacent components in comparison with a corresponding gearbox with single synchronization.

The purpose of the present invention is to achieve a gearbox with double synchronization, the length of which does not need to be greater than a corresponding gearbox with single synchronization, so that a manufacturer of, for example, both types of gearboxes can use a number of common components therefor.

This is achieved according to the invention by virtue of the fact that the torque-transmitting element has, firstly, driver fingers extending from its outer periphery radially and sunk into the guide sleeve, said driver fingers being received in notches in the guide sleeve, and, secondly, has first driver elements engaging in notches in the outer synchronizing ring and second driver elements engaging in notches in the inner synchronizing ring.

In a synchronizing device made in this manner, the torque transmitting element does not require any extra axial space, since its driving projections are sunk in the guide sleeve. This also means that the axial length of the synchronizing rings can be increased in a given gearbox compared to the solution shown in the Swedish Lay-Open Print 448 182, thus increasing the frictional surfaces and thereby the transmitting capacity.

Figure 5B:
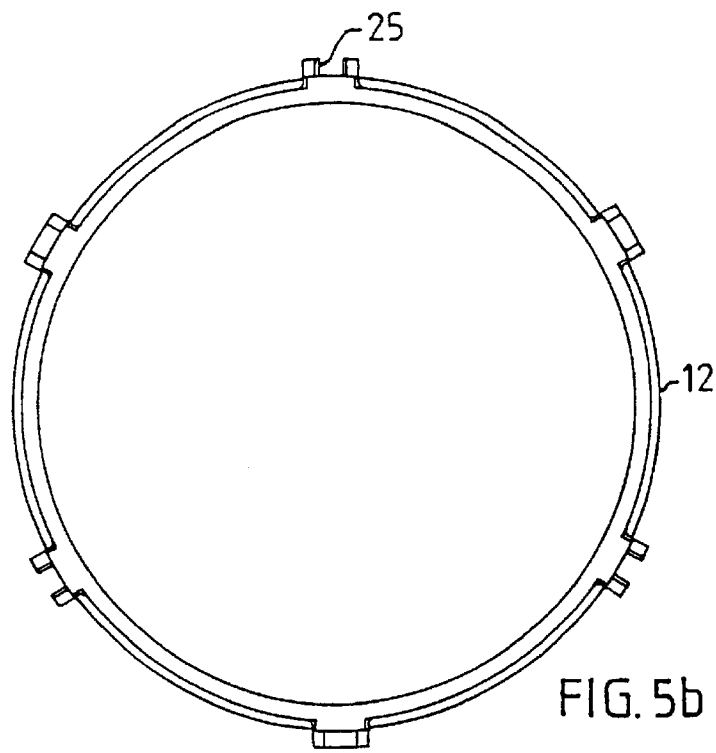
Figure 5A:
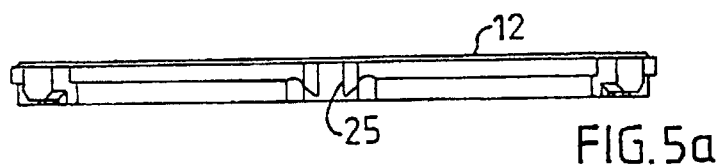
Figure 6A:
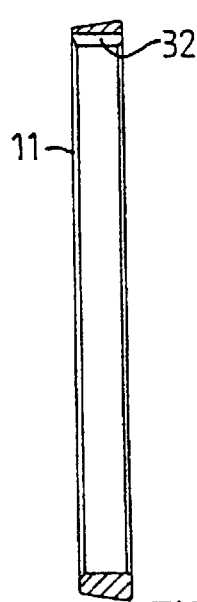
Figure 6B:
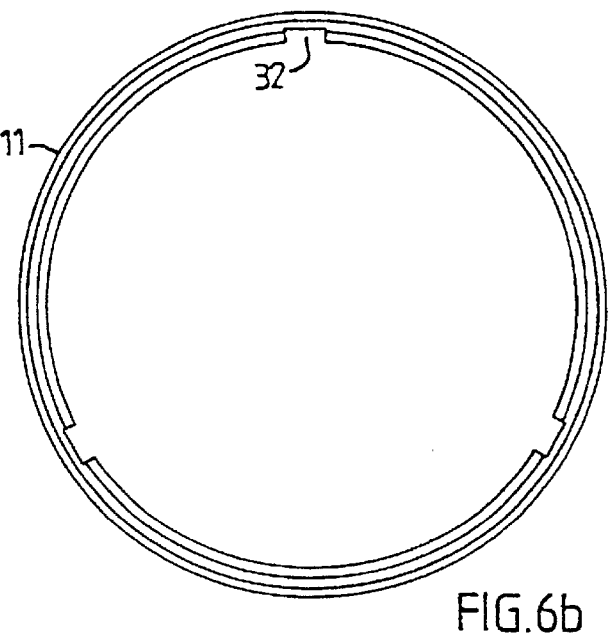

The invention is described in more detail below with reference to the examples shown in the accompanying drawings, where FIG. 1 shows a longitudinal section through a pair of free gears with an embodiment of the synchronizing device according to the invention, FIG. 2 shows a plan view of the guide sleeve in FIG. 1, FIG. 3 is a plan view of the torque-transmitting element, FIG. 4 is a longitudinal section therethrough, FIGS. 5a and 5b show a side view and a plan view, respectively, of the outer synchronizing ring, and FIGS. 6a and 6b show a longitudinal section and a plan view, respectively, of the inner synchronizing ring.

The synchronizing device according to the invention comprises a guide sleeve 2, non-rotatably mounted on a shaft 1, and on this guide sleeve, an engaging sleeve 3 is axially displaceably but non-rotatably mounted via axial teeth. On the shaft 1, which can be a main shaft in a truck gearbox, a pair of gears 4 and 5 are rotatably mounted on needle bearings. The engaging rings 6 with external engaging teeth 7 are solidly joined to the respective gears 4 and 5. The synchronizing cones 8 have external and internal frictional surfaces and are provided with pins 9, which extend into openings 10 in the engaging rings 6, thereby making the synchronizing cones 8 rotationally fixed but limitedly axially movable relative to the engaging rings 6. Outer and inner synchronizing rings 12 and 11, respectively, are arranged on either side of the respective synchronizing cone and are provided with frictional surfaces, which face the frictional surfaces of the synchronizing cones. Spring-biased locking bodies 13 are arranged in a known manner between the guide sleeve 2 and the engaging sleeve 3. A torque transmitting element, generally designated 20 (FIGS. 3 and 4), transmits torque between the synchronizing rings 11 and 12.

The torque-transmitting element 20 consists, as can best be seen in FIGS. 3 and 4, of a narrow annular sheet metal disc 21, having three evenly spaced long driver fingers 22 and, therebetween, three evenly spaced short driver fingers 23. The long driver fingers 22 have a first portion 22a bent axially from the plane of the disc 21, a second radial portion 22b and an end portion 22c, which is bent axially inwards towards the plane of the disc. The three short driver fingers 23 are bent radially from an axially bent-over edge at the inner periphery of the disc. The end portions 22c of the long driver fingers 22 project into notches 25 in the outer synchronizing ring 12, as can be seen in FIG. 1, while the short driver fingers 23 project into notches 32 in the inner synchronizing ring 11.

The guide sleeve 2 is made with six radial, evenly spaced notches 26, which extend inwardly from the outer periphery of the guide sleeve. Every other notch 26 receives the driver fingers 22 from the element 20 disposed to the right of the guide sleeve 2, as seen in FIG. 1, for the synchronizing rings to the gear 5, while the notches 26 therebetween are intended to receive corresponding driver fingers on a torque-transmitting element (not shown) for the synchronizing rings to the gear 4. As can be seen in FIG. 1, the driver fingers 22 are sunk into the notches 26, so that the surfaces 27 of the radial portions 22b facing the synchronizing rings 11,12 lie within the edge of the notch 26, at the same time as the opposing surface on the inner synchronizing ring lies relatively close to the surface 27 on the driver fingers. Axial heels 28 on the element 20 limit its axial displacement in the direction towards the guide sleeve 2 upon contact with the outer portions of the guide sleeve between the notches 26.

In this embodiment, as can be seen in FIG. 1, the radially inner portion of the engaging rings 6 is provided with a step 30. The element 20 is dimensioned as regards the length of the axial portion 22a of the driver fingers 22 and the inner diameter of the disc 21 so that the inner peripheral surface 31 of the disc 21 lies concentrically radially outside the cylindrical surface of the step 30.

The above described arrangement provides a double synchronization, the element 20 of which for transmitting torque between the synchronizing rings 11 and 12 does not require any extra space in the gearbox.

What is claimed is:

1. Synchronizing device in a vehicle gearbox, comprising a guide sleeve, intended to be non-rotatably joined to a shaft in the gearbox, an engaging sleeve, which is non-rotatably but axially displaceably mounted on the guide sleeve, an engaging ring provided with external engaging teeth, said ring being intended to be solidly joined to a gear rotatably mounted on the shaft and be lockable relative to the guide sleeve by axial displacement of the engaging sleeve from a neutral position to an engagement position, in which internal engaging teeth on the engaging sleeve engage the external teeth on the engaging ring, and synchronizing means cooperating with the engaging sleeve and the engaging ring in the form of at least two concentric synchronizing rings each having a conical frictional surface, said rings being movable into engagement with opposing conical frictional surfaces on a synchronizing cone lying between the synchronizing rings and being fixed rotationally relative to the engaging ring, the one synchronizing ring being fixed rotationally relative to the other synchronizing ring by means of an annular torque-transmitting element, wherein the torque-transmitting element (20) comprises:

first driver fingers (22) extending radially from an outer periphery thereof, said first driver fingers (22) being received in notches (26) in the guide sleeve (2);
  first driver elements (22c) engaging in notches (25) in the outer synchronizing ring (12); and
  second driver elements (23) engaging in notches (32) in the inner synchronizing ring (11).

2. Device according to claim 1, wherein radial surfaces (27) on the first driver fingers (22), which surfaces face the synchronizing rings (11,12), are essentially aligned with an edge of the notches (26) in the guide sleeve.

3. Device according to claim 1, characterized in that the torque-transmitting element (20) is a pressed and clipped sheet metal part.

4. Device according to claim 1, wherein the torque-transmitting element (20) has at least three evenly spaced said first driver fingers (22) in engagement with the outer synchronizing ring (12) and, spaced therebetween, second driver fingers (23) in engagement with the inner synchronizing ring (11).

5. Device according to claim 1, characterized in that the torque-transmitting element (20) has spacer elements (28) directed towards the guide sleeve (2), which are arranged, upon contact with the outer portions of the guide sleeve between the notches (26), to limit the axial displacement of the torque-transmitting element towards the guide sleeve.

6. Device according to claim 1, wherein the engaging ring (6) has a radial inner portion with a step (30), an inner peripheral limiting surface (31) of the torque-transmitting element (20) being concentric with a cylindrical surface of the step.

* * * * *